United States Patent
Wiemann et al.

(10) Patent No.: US 10,548,055 B2
(45) Date of Patent: Jan. 28, 2020

(54) NETWORK NODE, WIRELESS DEVICE, METHODS AND COMPUTER PROGRAMS

(71) Applicant: Telefonaktiebolaget LM Ericsson (publ), Stockholm (SE)

(72) Inventors: Henning Wiemann, Aachen (DE); Peter Alriksson, Hörby (SE); David Sugirtharaj, Lund (SE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 15/440,860

(22) Filed: Feb. 23, 2017

(65) Prior Publication Data

US 2017/0164247 A1 Jun. 8, 2017

Related U.S. Application Data

(63) Continuation of application No. PCT/EP2016/078152, filed on Nov. 18, 2016.
(Continued)

(51) Int. Cl.
| | |
|---|---|
| *H04W 36/00* | (2009.01) |
| *H04W 16/14* | (2009.01) |
| *H04W 48/12* | (2009.01) |
| *H04J 11/00* | (2006.01) |
| *H04L 5/00* | (2006.01) |

(52) U.S. Cl.
CPC ..... *H04W 36/0066* (2013.01); *H04J 11/0069* (2013.01); *H04L 5/0053* (2013.01); *H04W 16/14* (2013.01); *H04W 48/12* (2013.01); *H04J 2211/005* (2013.01); *H04L 5/0007* (2013.01); *Y02D 70/126* (2018.01)

(58) Field of Classification Search
None
See application file for complete search history.

(56) References Cited

U.S. PATENT DOCUMENTS

| | | | |
|---|---|---|---|
| 2012/0327895 A1* | 12/2012 | Wallen | H04W 48/12 370/330 |
| 2013/0195073 A1 | 8/2013 | Chen et al. | |

(Continued)

OTHER PUBLICATIONS

3GPP TSG RAN WG1 Media Tek Inc, "Enhanced DRS Design for LAA", Oct. 5-9, 2015, pp. 1-7.*
(Continued)

*Primary Examiner* — Adnan Baig
(74) *Attorney, Agent, or Firm* — Murphy, Bilak & Homiller, PLLC

(57) ABSTRACT

A network node for wireless access operating cell in a cellular network for a licensed or unlicensed frequency band and arranged for serving wireless devices in an unlicensed frequency band is disclosed. The network node is arranged to transmit a discovery reference signal (DRS) comprising a first and a second synchronization signal for enabling the wireless devices to find and measure the cell, wherein the DRS, when the network node operates a primary cell in the unlicensed frequency band, comprises system information, and additional or adapted synchronization signal for enabling the wireless devices to identify the presence of the system information and acquire further cell information. A wireless device for operating with such a network node is also disclosed.

35 Claims, 8 Drawing Sheets

Related U.S. Application Data

(60) Provisional application No. 62/264,565, filed on Dec. 8, 2015.

(56) References Cited

U.S. PATENT DOCUMENTS

| | | | |
|---|---|---|---|
| 2015/0003348 A1* | 1/2015 | Ishii | H04L 27/2601 370/329 |
| 2017/0099126 A1* | 4/2017 | Yoo | H04L 5/0048 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11) The present", 3GPP TS 36.331 V11.5.0, Sep. 2013, 1-347.

Unknown, Author, "Enhanced DRS Design for LAA", MediaTek Inc., 3GPP TSG RAN WG1 Meeting #82b, R1-156057, Malmo, Sweden, Oct. 5-9, 2015, 1-7.

Unknown, Author, "LTE-U Forum", Alcatel-Lucent et al., LTE-U CSAT Procedure T5 V1.0, Oct. 2015, 1-7.

* cited by examiner

Aggregated bandwidth of 100 MHz

NETWORK NODE, WIRELESS DEVICE, METHODS AND COMPUTER PROGRAMS

TECHNICAL FIELD

The present invention generally relates to a network node for wireless access operating a cell in a cellular network for a licensed or unlicensed frequency band and arranged for serving wireless devices in an unlicensed frequency hand, such a wireless device, methods therefor, and computer programs for implementing the methods.

BACKGROUND

Cellular communication systems have traditionally used licensed frequency bands, and still use. The 3rd Generation Partnership Project (3GPP) initiative "License Assisted Access" (LAA) intends to allow Long Term Evolution (LTE) equipment to also operate in the unlicensed radio spectrum such as the 5 GHz band. The unlicensed spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell. It is also possible that also the PCell operates in unlicensed spectrum.

In this context, the primary cell is a cell operating on a frequency on which wireless devices perform initial connection establishment procedures or initiates connection re-establishment procedure, e.g., indicated as primary cell in handover procedure. The term is used to differentiate from secondary cell, which is a cell operating on another frequency which may be configured once a radio resource control connection is established, wherein the secondary cell may be used to provide additional radio resources.

Regulatory requirements, however, may not permit transmissions in the unlicensed spectrum without prior channel sensing. Since the unlicensed spectrum must be shared with other radios of similar or dissimilar wireless technologies, a so-called listen-before-talk (LBT) method may need to be applied. Today, the unlicensed 5 GHz spectrum is mainly used by equipment implementing the IEEE 802.11 Wireless Local Area Network (WLAN) standard. This standard is known under its marketing brand "Wi-Fi."

The term "unlicensed spectrum" is widely used within the field and emanates from that national, regional or international radio spectrum institutions, e.g., Federal Communications Commission (FCC), Electronic Communications Committee (ECC), International Telecommunication Union (ITU), make spectrum available either on a licensed or unlicensed basis. While a licensed spectrum is allocated to a particular entity, i.e., operator or government (military, aviation, marine, etc.), the unlicensed spectrum is made available for any innovator or consumer who can use the unlicensed spectrum just by following some technical rules set up for the unlicensed spectrum. This low-regulation system lets innovators deliver a multitude of unlicensed offerings such as Wi-Fi hotspots, medical equipment, industrial/logistics/inventory systems, wireless headsets, cordless phones, remote car door openers, wireless keyboards, etc. This disclosure relates to wireless communication similar to what is used in cellular communication systems, e.g. (LTE) in licensed spectrum but where also unlicensed spectrum may be used.

The LBT procedure leads to uncertainty at the eNodeB (eNB) regarding whether or not it will be able to transmit one or more downlink (DL) subframes. This leads to a corresponding uncertainty at the user equipment (UE) as to whether or not it actually has a subframe to decode. An analogous uncertainty exists in the UL direction where the eNB is uncertain if the UEs actually transmitted.

Data rate selection by selecting a modulation and coding scheme (MCS) to the UEs is primarily based on channel quality indicator (CQI) reports sent from the UE to the eNB via the PCell in LAA. Of course, data buffer and quality of service (QoS) is also used as input to decide this. While the channel quality is good as indicated by the CQI report, the eNB for other reasons may not able to recently schedule transmission of any discovery reference signal (DRS) for the UEs to perform timing, frequency and gain setting adjustments.

In LAA, eNB must perform listen before talk (LBT) prior to data transmission on the SCell. LBT Category 4 with exponential back-off is a non-aggressive scheme that allows good coexistence with Wi-Fi and other unlicensed spectrum users. The discovery signal that is transmitted every 40 ms or so is an important reference signal transmitted to allow the UE to maintain coarse synchronization with the eNB. It will use a more aggressive LBT mechanism to ensure that it is not starved. Even so, due to the load in the band it cannot be guaranteed that it will always succeed. Current assumption is, that the start of the discovery signal is restricted to LTE subframe borders and that the start of regular data transmissions are restricted to a few fixed positions within the subframe, including the subframe border.

Recently there have also been proposals to operate LTE in unlicensed spectrum without the aid of a licensed carrier. In such an operation, the PCell will also operate on the unlicensed carrier and thus essential control signals and channels will also be subject to unmanaged interference and CCA.

Further the carrier (re)selection process (when the network node changes its carrier frequency during operation) becomes more problematic when it is also applied to the PCell (or serving cell in IDLE), because then there is no cell that the UE is "anchored" to during the carrier frequency change.

In systems such as LTE, system information is provided and may be broadcasted by a network node over a logical channel, e.g., a broadcast control channel (BCCH). This logical channel information may further be carried over a transport channel, e.g., broadcast channel, BCH, or be carried by a downlink shared channel (DL-SCH). There may be two parts in system information: static part and dynamic part. The static part is usually called master information block (MIB), and is transmitted using, e.g., the BCH and may for example be carried by a physical broadcast channel (PBCH) once every 40 ms. The MIB may carry useful information which includes channel bandwidth, physical hybrid automatic repeat request indicator channel (PHICH) configuration details, transmit power, number of antennas and SIB scheduling information transmitted along with other information on the DL-SCH. The dynamic part is usually called system information block (SIB), and may be mapped on radio resource control (RRC) system information messages over DL-SCH and transmitted using physical downlink channel (PDSCH) at periodic intervals. There are different types of SIBs having different tasks and being transmitted with different intervals. They are normally referred to as SIB1, SIB2, etc. For example, SIB1 may be transmitted every 80 ms and provide cell access related parameters and scheduling for other SIBs, SIB2 may be transmitted every 160 ms and provide common and shared channel configuration, and SIB3 may be transmitted every 320 ms and provide parameters required for intra-frequency, inter-frequency, and inter-radio access technology re-selection. SIBs may be grouped in system information containers, where each container may be composed of multiple SIBs.

In LTE Release 12 there is a clear relationship with the position of synchronization signals and the position of the master information block (MIB) and system information block type 1, SIB1, as illustrated in FIG. 13, which are essential to decode quickly for the UE. The secondary synchronization signal with sequence zero (SSS0 in subframe 0, SF0) points out position of the MIB. The same signal with sequence 1 (SSS1 in subframe 5, SF5) points out the position of SIB1.

Later in LTE Release 13, since no system information (MIB and SIB1) is transmitted in the unlicensed SCell, as illustrated in FIG. 14, there is no consideration regarding "floating" and transmitting the secondary synchronization signals SSS0 and SSS1 pretty much in any subframe. The following was agreed in Release 13 LAA: Scrambling sequences of PSS/SSS/CRS/CSI-RS composing DRS are generated using subframe index 0 when transmitted in subframe 0~4, and using subframe index 5 when transmitted in subframe 5-9.

LTE-U Standalone is based on LTE Release 13 but is required to transmit the system information including MIB and SIB1 in a discovery measurement timing configuration, DMTC, window and must transmit using the rules mentioned above.

Note that also in Release 13 and now in LTE-U Standalone, regular SSS0 and SSS1 will be transmitted opportunistically (piggybacked when there is data to transmit) outside of the DMTC.

Before the UE has read system information, it does not know where in time the DMTC window located and thus it does not know if a detected PSS/SSS pair coincides with a system information transmission. Hence due to SSS signals appearing in various subframes with and without the MIB/SIB1 being present it can confuse the UE, wherein there is a risk of spending power and computing resources in vain. It is therefore a desire to alleviate this problem.

SUMMARY

The invention is based on the understanding that by providing system information in certain transmissions and enabling recognition of these transmissions it is facilitated for wireless devices to gain knowledge of whether desired system information is present or not.

According to a first aspect, there is provided a network node for wireless access operating a cell in a cellular network for a licensed or unlicensed frequency band and arranged for serving wireless devices in an unlicensed frequency band. The network node is arranged to transmit a discovery reference signal (DRS) comprising a first and a second synchronization signal for enabling the wireless devices to find and measure the cell. The DRS, when the network node operates a primary cell in the unlicensed frequency band, comprises system information, and additional or adapted synchronization signal for enabling the wireless devices to identify the presence of the system information and acquire further cell information.

The system information may be contained in a master information block (MIB) and in a system information block (SIB). For example, the SIB may include a SIB type 1, SIB1, or a combination of SIBs, e.g., SIB1 and SIB type 2, SIB2. The MIB and the SIB and the first and the second synchronization signals may be mutually positioned in the DRS at predetermined positions.

The network node may be arranged to omit inclusion of the system information in transmissions other than the transmission of the DRS in a discovery measurement timing configuration (DMTC) window when the network node operates a primary cell in the unlicensed frequency band.

The first synchronization signal may be a primary synchronization signal (PSS) and the second synchronization signal may be a secondary synchronization signal (SSS).

The additional synchronization signal may comprise a synchronization signal being a replica corresponding to the first or the second synchronization signal.

The additional synchronization signal may comprise a synchronization signal corresponding to the first or the second synchronization signal but with a different sequence code.

The adapted synchronization signal may comprise that of the first and second synchronization signals has a different sequence than for a legacy DRS or for a transmission other than the transmission of the DRS in a DMTC window when the network node operates a primary cell in the unlicensed frequency band.

The adapted synchronization signal may comprise that one of the first and second synchronization signals has a different sequence for the DRS transmission in a DMTC window than for a transmission other than the transmission of the DRS in the DTMC window when the network node operates a primary cell in the unlicensed frequency band.

The network node may be capable of operating according to Long Term Evolution (LTE).

According to a second aspect, there is provided a method of a network node for wireless access operating a cell in a cellular network for a licensed or unlicensed frequency band and arranged for serving wireless devices in an unlicensed frequency band. The method comprises transmitting a discovery reference signal (DRS) comprising a first and a second synchronization signal for enabling the wireless devices to find and measure the cell. The DRS, when the network node operates a primary cell in the unlicensed frequency band, comprises system information, and the method comprises adding or adapting a synchronization signal for enabling the wireless devices to identify the presence of the system information and acquire further cell information.

The system information may be contained in a master information block (MIB) and in a system information block (SIB). For example, the SIB may include a SIB type 1, SIB1, or a combination of SIBs, e.g., SIB1 and SIB type 2, SIB2. The MIB and the SIB and the first and the second synchronization signals may be mutually positioned in the DRS at predetermined positions.

The method may comprise omitting inclusion of the system information in transmissions other than the transmission of the DRS in a discovery measurement timing configuration (DMTC) window when the network node operates a primary cell in the unlicensed frequency band.

The first synchronization signal may be a primary synchronization signal (PSS), and the second synchronization signal may be a secondary synchronization signal (SSS).

The additional synchronization signal may comprise a synchronization signal being a replica corresponding to the first or the second synchronization signal.

The adding of a synchronization signal may comprise adding a synchronization signal corresponding to the first or the second synchronization signal but with a different sequence.

The adapting of a synchronization signal may comprise adapting one of the first and second synchronization signals to have a different sequence than for a legacy DRS or for a transmission other than the transmission of the DRS in a DMTC window when the network node operates a primary cell in the unlicensed frequency band.

The adapting of a synchronization signal may comprise adapting one of the first and second synchronization signals to have a different sequence for the DRS transmission in a DMTC window than for transmissions other than the transmission of the DRS in the DMTC window when the network node operates a primary cell in the unlicensed frequency band.

The method may comprise including the system information and the first and the second synchronization signal, at DRS transmissions outside a DMTC window, for enabling the wireless devices to find and measure the cell.

According to a third aspect, there is provided a computer program comprising instructions which, when executed on a processor of a network node, causes the network node to perform the method according to the second aspect.

According to a fourth aspect, there is provided a wireless device operating in a cellular network for a licensed or unlicensed frequency band and arranged for being served by a network node in an unlicensed frequency band. The wireless device is arranged to receive a transmission from the network node, determine synchronization signals in the transmission, and from the synchronization signals determine whether it is a discovery reference signal (DRS) comprising system information by identifying an additional or adapted synchronization signal in the transmission, and, upon determined presence of the system information, read the system information.

The system information may be contained in a master information block (MIB) and in a system information block (SIB). For example, the SIB may include a SIB type 1, SIB1, or a combination of SIBs, e.g., SIB1 and SIB type 2, SIB2. The wireless device may be arranged to find the MIB and the SIB and the first and the second synchronization signals contained in the DRS at predetermined mutual positions.

The wireless device may be arranged to omit searching for the system information in the transmissions when no additional or adapted synchronization signal is found.

The first synchronization signal may be a primary synchronization signal (PSS) and the second synchronization signal may be a secondary synchronization signal (SSS).

The additional synchronization signal may comprise a synchronization signal being a replica corresponding to the first or the second synchronization signal.

The wireless device may be arranged to identify the additional synchronization signal as a synchronization signal corresponding to the first or the second synchronization signal but with a different sequence.

The wireless device may be arranged to identify the adapted synchronization signal by identifying that one of the first and second synchronization signals has a different sequence than for a legacy DRS or for a transmission other than the transmission of the DRS in a DMTC window when the network node operates a primary cell in the unlicensed frequency band.

The wireless device may be arranged to identify the adapted synchronization signal by identifying that one of the first and second synchronization signals has a different sequence for the DRS transmission in a DMTC window than for a transmission other than the transmission the DRS in the DMTC window then the network node operates a primary cell in the unlicensed frequency band.

The wireless device may be capable of operating according to Long Term Evolution (LTE) in the unlicensed frequency band without assistance from a network node operating in the licensed frequency band.

According to a fifth aspect, there s provided a method of a wireless device operating in a cellular network for a licensed or unlicensed frequency band and arranged for being served by a network node in an unlicensed frequency band. The method comprises receiving a transmission from the network node, determining synchronization signals in the transmission, determining, from the synchronization signals, whether it is a discovery reference signal (DRS) comprising system information by identifying an additional or adapted synchronization signal in the transmission, and reading the system information upon determined presence of the system information.

The system information may be contained in a master information block (MIB) and in a system information block (SIB). For example, the SIB may include a SIB type 1, SIB1, or a combination of SIBs, e.g., SIB1 and SIB type 2, SIB2. The method may comprise finding the MIB and the SIB and the first and the second synchronization signals contained in the DRS at predetermined positions related to each other.

The method may comprise omitting search for the system information in the transmissions when no additional or adapted synchronization signal is found.

The first synchronization signal may be a primary synchronization signal (PSS), and the second synchronization signal may be a secondary synchronization signal (SSS).

The additional synchronization signal may comprise a synchronization signal being a replica corresponding to the first or the second synchronization signal.

The method may comprise identifying the additional synchronization signal as a synchronization signal corresponding to the first or the second synchronization signal but with a different sequence.

The method may comprise identifying the adapted synchronization signal by identifying that one of the first and second synchronization signals has a different sequence than for a legacy DRS or for a transmission other than the transmission of the DRS in a DMTC window when the network node operates a primary cell in the unlicensed frequency band.

The method may comprise identifying the adapted synchronization signal by identifying that one of the first and second synchronization signals has a different sequence for the DRS in a DMTC window than for transmissions other than the transmission of the DRS in the DMTC window when the network node operates a primary cell in the unlicensed frequency band.

According to a sixth aspect, there is provided a computer program comprising instructions which, when executed on a processor of a wireless device, causes the wireless device to perform the method according to the fifth aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

In the following disclosure, LTE will be used as a tangible example. However, the principles of inventive contributions herein may also be applicable to other systems, as will be readily understood from the disclosure below.

Figure 1:
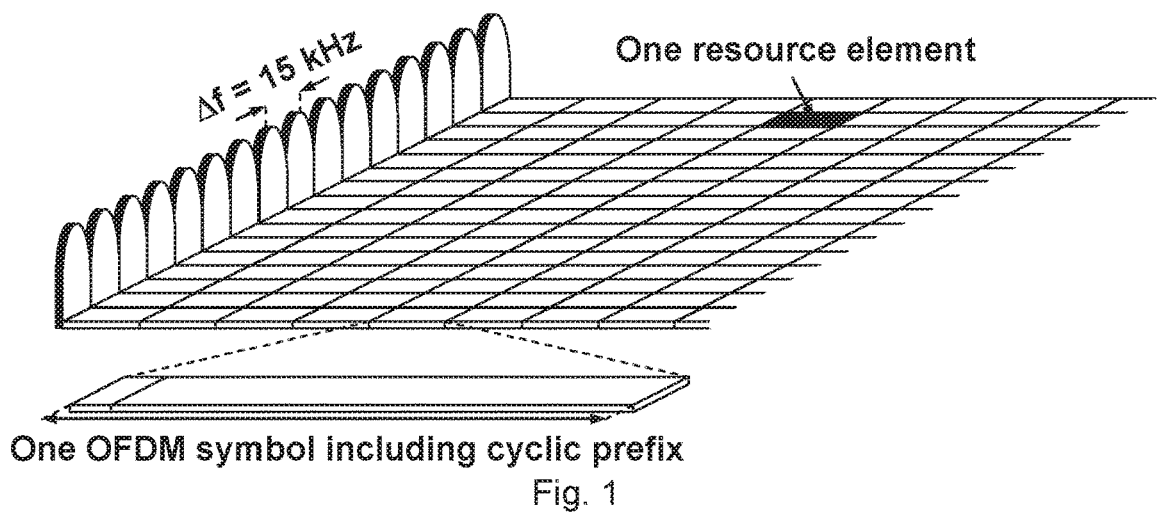
FIG. 1 schematically illustrates the LTE downlink physical resource grid.

LTE uses orthogonal frequency division multiplexing (OFDM) in the downlink and discrete Fourier transform (DFT) spread OFDM, also referred to as single-carrier frequency division multiple access (SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

Figure 2:
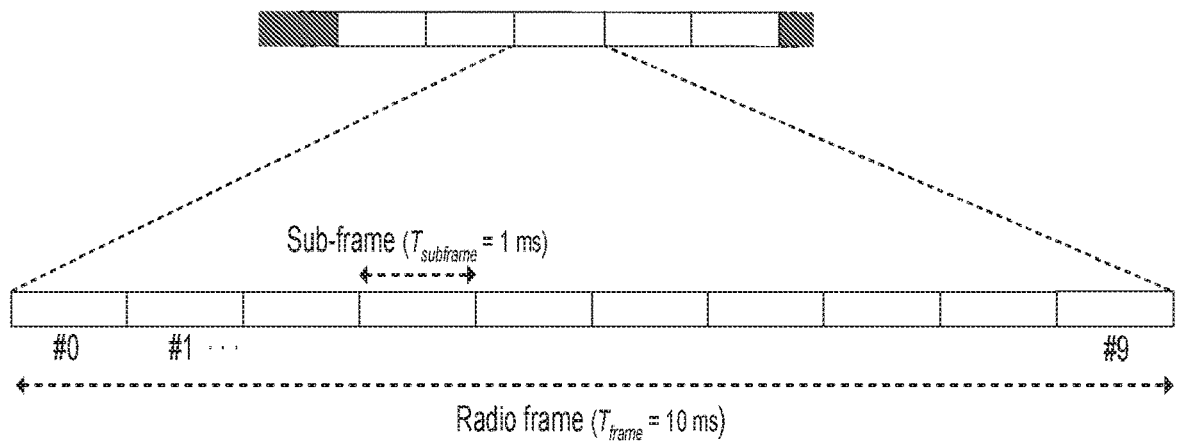
FIG. 2 schematically illustrates time-domain structure of LTE.

In the time domain, LTE downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g., the control information. A downlink system with CFI=3 OFDM symbols as control is illustrated in FIG. 3.

From LTE Rel-11 onwards, above described resource assignments can also be scheduled on the enhanced Physical Downlink Control Channel (ePDCCH). For Rel-8 to Rel-10 only Physical Downlink Control Char (PDCCH) is available.

Figure 3:
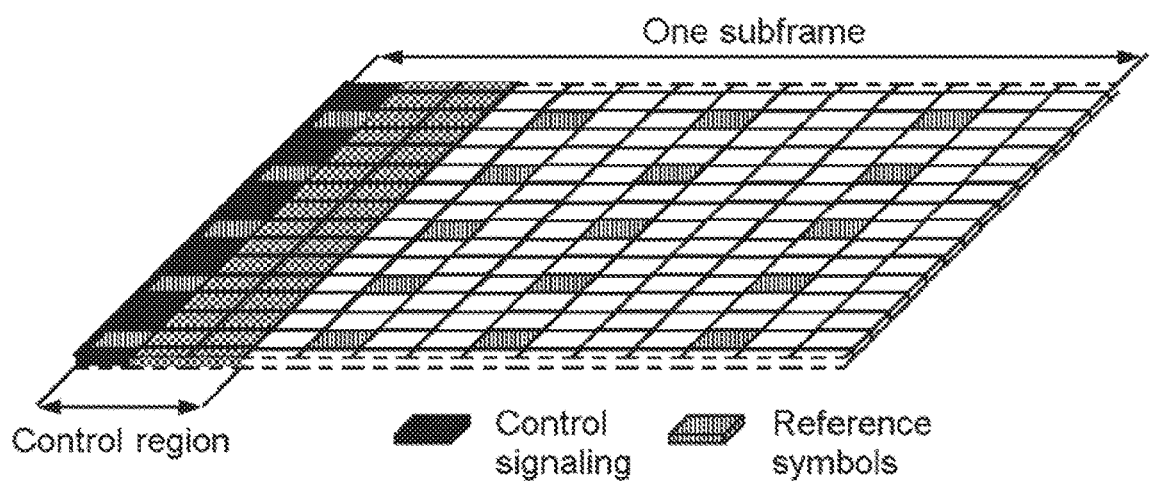
FIG. 3 schematically illustrates a normal downlink subframe structure in LTE.

The reference symbols shown in the above FIG. 3 are the cell specific reference symbols (CRS) and are used to support multiple functions including fine time and frequency synchronization and channel estimation for certain transmission modes.

The PDCCH/ePDCCH is used to carry downlink control information (DCI) such as scheduling decisions and power-control commands. More specifically, the DCI includes:

Downlink scheduling assignments, including Physical Downlink Shared CHannel (PDSCH) resource indication, transport format, hybrid-automatic repeat request (ARQ) information, and control information related to spatial multiplexing (if applicable). A downlink scheduling assignment also includes a command for power control of the Physical Uplink Control CHannel (PUCCH) used for transmission of hybrid-ARQ acknowledgements in response to downlink scheduling assignments.

Uplink scheduling grants, including Physical Uplink Shared CHannel (PUSCH) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, a possibility to transmit multiple scheduling messages within each subframe is provided. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

Here follows a discussion on the start symbol for PDSCH and ePDCCH within the subframe. The OFDM symbols in the first slot numbered from 0 to 6. For transmissions modes 1-9, the starting OFDM symbol in the first slot of subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the CFI value signaled in Physical Control Format Indicator CHannel (PCFICH).

Multiple OFDM starting symbol candidates can be achieved by configuring the UE in transmission mode 10, by having multiple ePDCCH Physical Resource Block (PRB) configuration sets where for each set the starting OFDM symbol in the first slot in a subframe for ePDCCH can be configured by higher layers to be a value from {1,2,3,4}, independently for each ePDCCH set. If a set is not higher layer configured to have a fixed start symbol, then the ePDCCH start symbol for this set follows the CFI value received in PCFICH.

Figure 4:
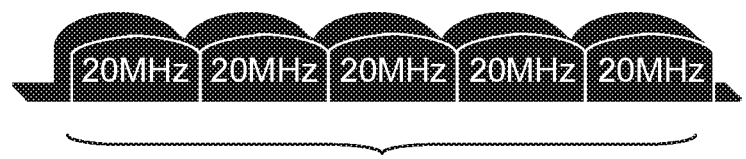
FIG. 4 is a schematic illustration of carrier aggregation.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments it can be expected that there will be a smaller number of LTE Rel-10-capable terminals compared to many LTE legacy terminals. Therefore, it is desired to assure an efficient use of a wide carrier also for legacy terminals, i.e., that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. An example of CA is illustrated in FIG. 4. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on, just one CC—either the same CC, or a different CC via cross-carrier scheduling; this mapping from (e)PDCCH to PDSCH is also configured semi-statically.

The UE performs periodic cell search and RSRP and RSRQ measurements in RRC Connected mode. It is responsible for detecting new neighbor cells, and for tracking and monitoring already detected cells. The detected cells and the associated measurement values are reported to the network. Reports to the network can be configured to be periodic or aperiodic based a particular event.

To share the channel in the unlicensed spectrum, the LAA SCell cannot occupy the channel indefinitely. One of the mechanisms for interference avoidance and coordination among small cells is SCell ON/OFF feature. In Rel-12 LTE, discovery signals were introduced to provide enhanced support for SCell ON OFF operations. Specifically, these signals are introduced to handle potentially severe interference situation (particularly on the synchronization signals) resulted from dense deployment as well as to reduce UE inter-frequency measurement complexity.

Figure 5:
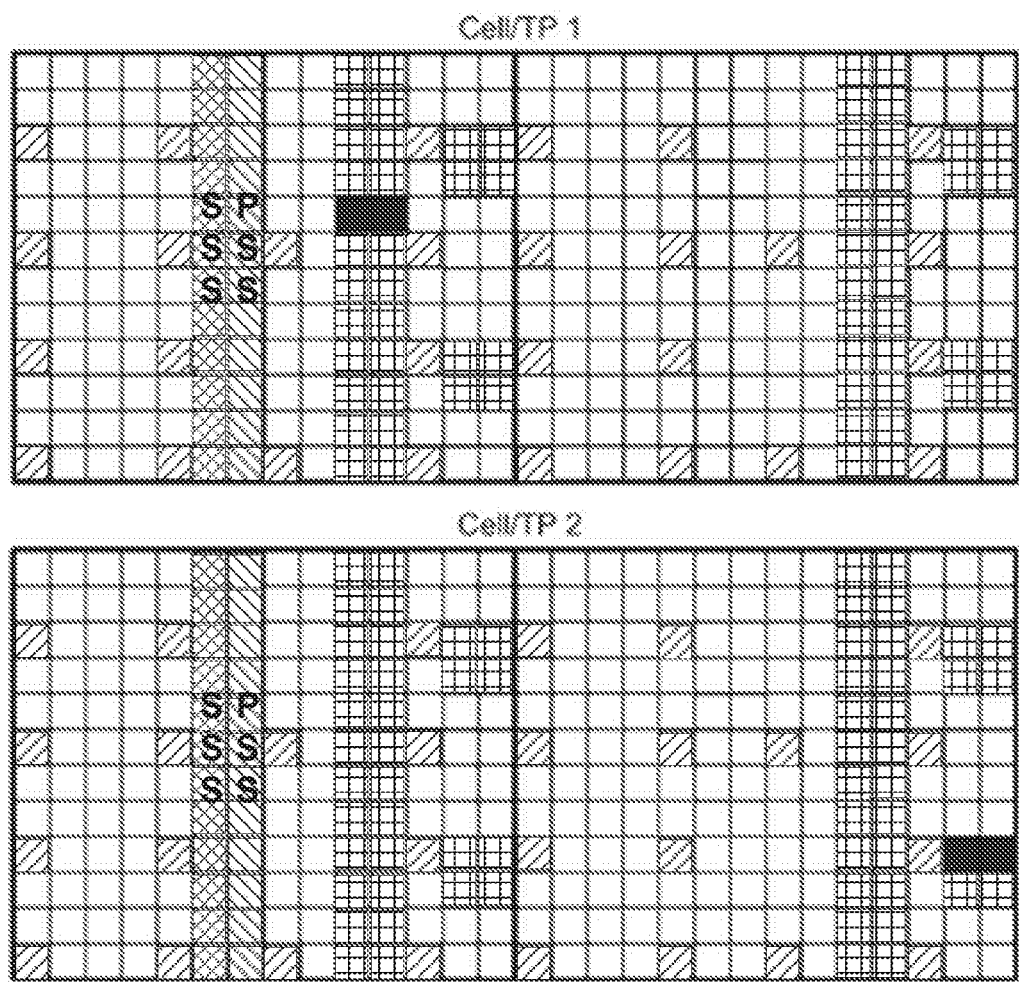
FIG. 5 illustrates presence of reference signals.

The discovery signals in a DRS occasion are comprised of the primary synchronization signal (PSS), secondary synchronization signal (SSS), CRS and when configured, the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell ID detected from the PSS and SSS. The CSI-RS is another signal that can be used in dense deployments for cell or transmission point identification. FIG. 5 shows an example of the presence of these signals in a DRS occasion of length equal to two subframes and also shows the transmission of the signals over two different cells or transmission points, Cell/TP 1 and Cell/TP 2. The different patterns illustrate an example how the different components of the DRS may be distributed.

The DRS occasion corresponding to transmissions from a particular cell may range in duration from one to five subframes for FDD and two to five subframes for time division duplex (TDD). The subframe in which the SSS occurs marks the starting subframe of the DRS occasion. This subframe is either subframe 0 or subframe 5 in both frequency division duplex (FDD) and TDD. In TDD, the PSS appears in subframe 1 and subframe 6 while in FDD the PSS appears in the same subframe as the SSS. The CRS are transmitted in all downlink subframes and Downlink Pilot Time Slot (DwPTS) regions of special subframes.

The discovery signals should be useable by the UE for performing cell identification, reference signal received power (RSRP) and reference signal received quality (RSRQ) measurements. The RSRP measurement definition based on discovery signals is the same as in prior releases of LTE. The RSSI measurement is defined as an average over all OFDM symbols in the downlink parts of the measured subframes within a DRS occasion. The RSRQ is then defined as

DRSRQ=$N$×DRSRP/DRSSI where N is the number of PRBs used in performing the measurement, DRSRP is the RSRP measurement based on the discovery signals and DRSSI is the RSSI measured over the DRS occasion.

In Rel-12, RSRP measurements based on the CRS and Channel State Information Reference Signal (CSI-RS) in the DRS occasions and RSRQ measurements based on the CRS in the DRS occasions have been defined. As stated earlier, discovery signals can be used in a small cell deployment where the cells are being turned off and on or in a general deployment where the on/off feature is not being used. For instance, discovery signals could be used to make RSRP measurements on different CSI-RS configurations in the DRS occasion being used within a cell, which enables the detection of different transmission points in a shared cell.

When measurements are made on the CSI-RS in a DRS occasion, the UE restricts its measurements to a list of candidates sent to the UE by the network via RRC signaling. Each candidate in this list contains a physical cell ID (PCID), a virtual cell ID (VCID) and a subframe offset indicating the duration (in number of subframes) between the subframe where the UE receives the CSI-RS and the subframe carrying the SSS. This information allows the UE to limit its search. The UE correlates to the received signal candidates indicated by a radio resource control RRC signal and reports back any CSI-RS RSRP values that have been found to meet some reporting criterion, e.g., exceeding a threshold value.

When a UE is being served on multiple carrier frequencies via a PCell and one or more SCells, the UE needs to perform radio resource management (RRM) measurements on other cells on the currently used carrier frequencies (intra-frequency measurements) as well as on cells on other carrier frequencies (inter-frequency measurements). Since the discovery signals are not transmitted continuously, the UE needs to be informed about the timing of the discovery signals so as to manage its search complexity. Furthermore, when a UE is being served on as many carrier frequencies as it is capable of supporting and inter-frequency RRM measurements need to be performed on a different carrier frequency that is not currently being used, the UE is assigned a measurement gap pattern. This gap pattern on a serving frequency allows the UE to retune its receiver for that frequency to the other frequency on which measurements are being performed. During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a discovery measurement timing configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as defined currently in LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

Figure 6:
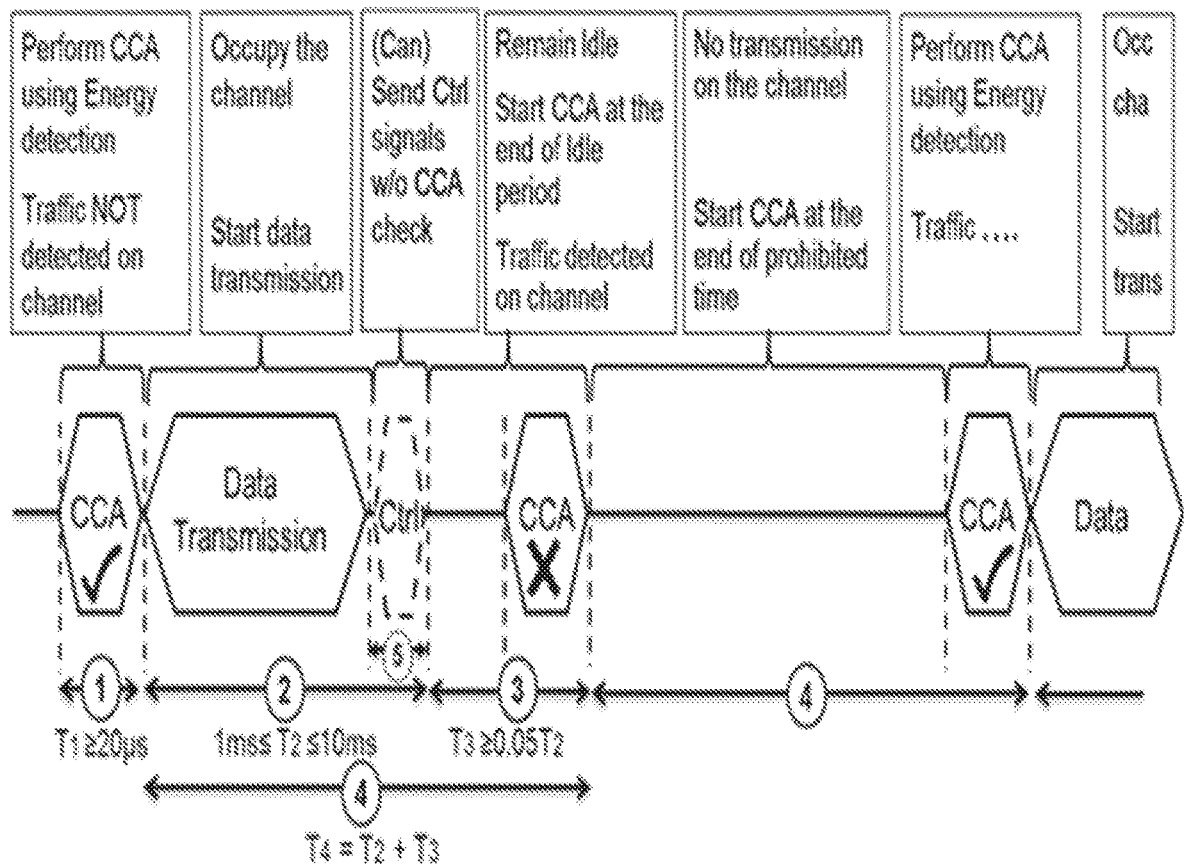
FIG. 6 schematically illustrates the listen before talk approach.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 6, where the CCA is performed during the period marked 1, transmissions are performed during the period marked 2 when the channel is clear. Here, control signalling may be performed during the period marked 5, i.e., within the period 2. During period 3, CCA is performed again, but now it is determined that there is no clear channel. Thus, no transmission is performed during period 4, but another CCA is performed at the end of period 4.

As there is a large available bandwidth of unlicensed spectrum, carrier selection required for LAA nodes to select the carriers with low interference and with that achieve good co-existence with other unlicensed spectrum deployments. For any technology, when deploying an additional node, the first rule for achieving high-performance for the new node itself as well as for the existing nodes is to scan the available channels and select one that would receive least interference for the node itself and cause least interference to existing nodes.

The basic principle behind carrier selection is for the eNB to scan and sense channels for interference or radar detection, and configure the SCell frequency accordingly based on the outcome of its carrier selection algorithm. The carrier selection process is separate and on a different time scale from the LBT/CCA procedure prior to transmissions on the unlicensed channels. It is expensive to move all attached UEs to another carrier frequency due to the signaling required and interruptions in the data flow.

Autonomous, semi-static carrier selection can be based on the eNB sensing of the averaged interference level, potential presence of radar signals if required, and traffic load on the candidate carriers over a relatively longer time scale. Once a suitable set of carriers is identified, they are added and activated as SCells for UEs. This process may be repeated periodically over tens or hundreds of milliseconds in order to keep reassessing the interference environment, and the associated measurements do not need any new specifications. Once a set of carriers is activated after the carrier selection process, transmissions can be performed dynamically on one or more of them based on LBT and fast DTX.

Traditionally, the spectrum used by LTE is dedicated to LTE. This has the advantage that LTE system does not need to care about the coexistence issue and the spectrum efficiency can be maximized. However, the spectrum allocated to LTE is limited which cannot meet the ever-increasing demand for larger throughput from applications/services. Extending LTE to exploit unlicensed spectrum in addition to licensed spectrum is therefore considered. Unlicensed spectrum can, by definition, he simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Figure 7:
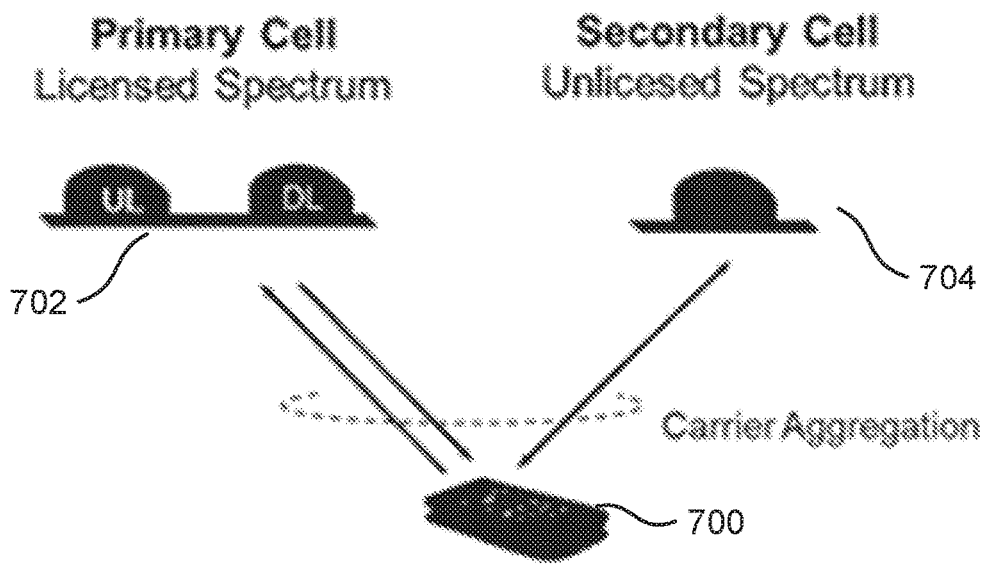
FIG. 7 schematically illustrates transmission from a secondary cell on an unlicensed frequency band.

Furthermore, one way to utilize the unlicensed spectrum reliably is to transmit essential control signals and channels on a licensed carrier. That is, as shown in FIG. 7, a UE 700 is connected to a primary cell, PCell, 702 in the licensed hand and one or more secondary cells, SCells, 704 in the unlicensed band. In this disclosure, a secondary cell in unlicensed spectrum is referred to as a license assisted secondary cell (LA SCell).

This disclosure provides for solutions for operating LTE in unlicensed spectrum without the aid of a licensed carrier. In such an operation, the PCell will also operate on the unlicensed carrier and thus essential control signals and channels will also be subject to unmanaged interference and CCA.

Further, the carrier (re)selection process (when the network node changes its carrier frequency during operation) becomes more problematic when it is also applied to the PCell (or serving cell in IDLE), because then there is no cell that the UE is "anchored" to during the carrier frequency change.

In UMTS 3GPP specifications, there is an optional field in litany reconfiguration messages indicating activation time. This is used to synchronize NodeB and UE switch of physical configuration, and for handover messages.

The activation time concept for physical channel configurations is not needed in LTE specifications due to that physical channel reconfiguration is dynamically changed and informed to the UE every sub frame in the DCI.

Since, in LTE-U Standalone, the existing SSS0 and SSS1 codes cannot indicate the presence of MIB and SIB1 system information, a new way to indicate this to the UE is presented here.

Also in MulteFire it is proposed to transmit the MIB/SIB1 in the same subframe, to reduce the transmission length to improve coexistence with other networks and technologies.

Hence it is proposed to add variations of existing SSS signals in the current positions or add a third orthogonal SSS and/or PSS signal. Some of the here proposed solutions have the advantage of being backwards compatible in another position. Some of the here proposed solutions does not have that advantage, but provides for other advantages, as will be understood from the disclosure below. Furthermore, some of the here proposed solutions have the advantage that the UE immediately can find out where the system information is. Some of the here proposed solutions have the advantage that the UE does not have to do blind decoding to determine the presence of system information, which affects UE power consumption. Some of the here presented solutions have the advantage that they enable soft combining for the MIB, which would not have been possible for other solutions where the UE would not know whether any MIB is present.

The non-limiting term "user equipment" or "UE", as used herein, can be any type of wireless device capable of communicating with network node or another UE over radio signals. The UE may also be radio communication device, target device, device to device (D2D) UE, machine type UE or UE capable of machine to machine communication (M2M), a sensor equipped with UE, PAD, Tablet, mobile terminals, smart phone, laptop embedded equipped (LEE), laptop mounted equipment (LME), USB dangles, Customer Premises Equipment (CPE), modem etc.

Further, the generic terminology "radio network node" or simply "network node (NW node)" or the specific term eNodeB may be interchangeably used herein. Such nodes can be any kind of network node comprising a transceiver, which may comprise base station, radio base station, base transceiver station, evolved Node B (eNB), Node B, Main eNode B (MeNode B). Secondary eNode B (SeNode B), relay node, access point, radio access point, Remote Radio Unit (RRU), Remote Radio Head (RRH), etc.

The UE is connected to a Primary Cell (PCell) (or a PSCell in dual connectivity) and may be configured by the network node with one or more Secondary Cells (SCells). The SCells may be in deactivated or activated state, depending on commands from the network node or expiry of a tinier, e.g., a SCell-Deactivation-Timer.

Figure 8:
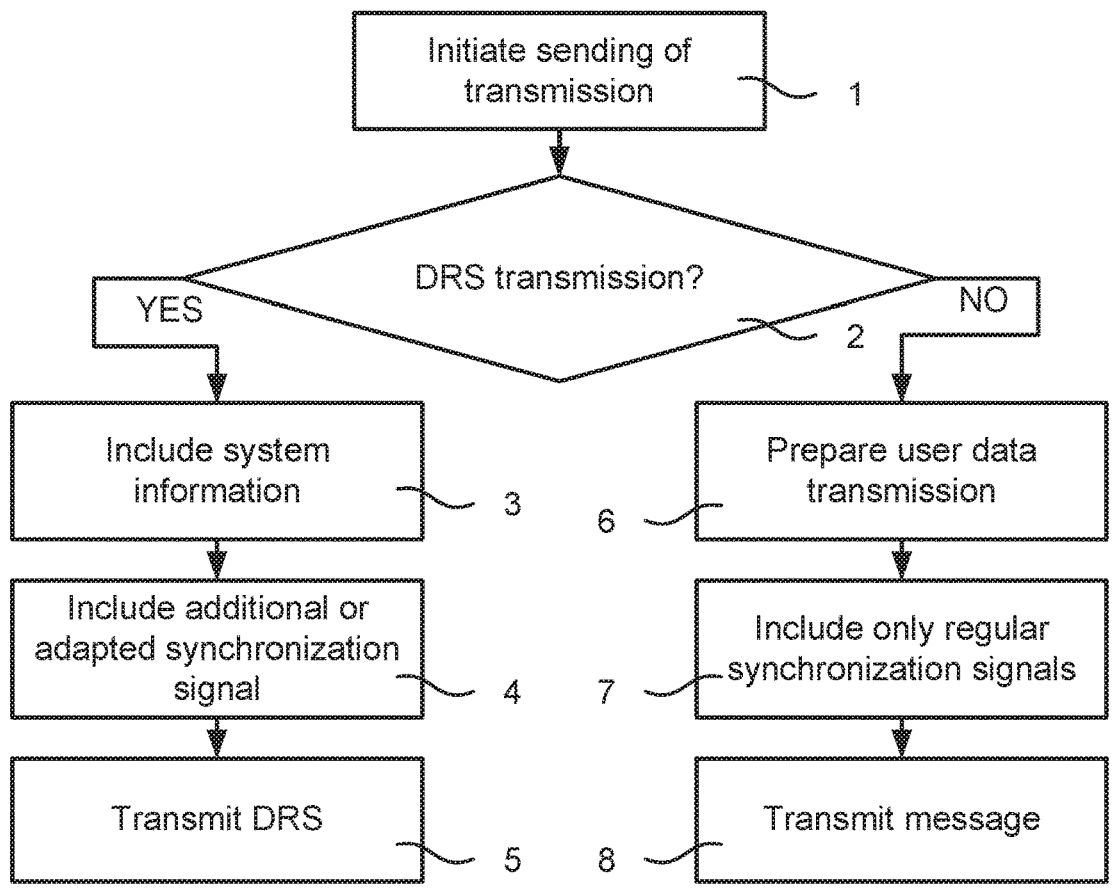
FIG. 8 is a flow chart illustrating a method according to an embodiment.

FIG. 8 is a flow chart illustrating a method of a network node for wireless access operating a cell in a cellular network for an unlicensed frequency band and arranged for serving wireless devices in the unlicensed frequency band. Upon initiating 1 sending of a transmission when the network de operates a primary cell in the unlicensed frequency band, the network node determines 2 whether it is a DRS transmission within a DMTC window. If not, the transmission carries on preparing 6 e.g., a user data transmission in a traditional way, and only regular synchronization signals, e.g., a first and a second synchronization signal such as a primary synchronization signal (PSS), and a secondary synchronization signal, SSS, are included 7, e.g., piggy-backed on whatever user data is to be transmitted, and transmission is performed 8. However, if the transmission is a DRS transmission, system information, e.g., a master information block (MIB) and a system information block type 1, SIB1, is included 3, as well as a first and a second synchronization signal for enabling the wireless devices to find and measure the cell. Still further, for a wireless device, such as a UE, to be able to identify the presence of the system information, as well s acquire further cell information, an additional or adapted synchronization signal is included 4. The DRS transmission then performed 5. Embodiments and variants of the additional and/or adapted synchronization signals are further discussed with reference to FIGS. 15-19. However, the basic principle is that the receiving wireless device should be able to discriminate a DRS transmission containing system information from other transmissions by observing the additional and/or adapted synchronization signal.

For DRS transmissions outside the DMTC window (e.g., in subframe 0), system information, e.g., a master information block (MIB) and optionally a system information block type 1, SIB 1, is included 3, as well as a first and a second synchronization signal for enabling the wireless devices to find and measure the cell. Still further, for a wireless device, such as a UE, to be able to identify the presence of the system information, as well as acquire further cell information, an additional or adapted synchronization signal is included 4. The DRS transmission is then performed 5.

In MulteFire, the DMTC window is denoted DTxW, A subframe carrying DRS within the DTxW, i.e., the DMTC window, ay for example consist of PSS/SSS/CRS, CSI-RS, if configured, MF-PSS/ME-SSS, MIB-MF on MF-PBCH, and SIB-MF on PDSCH (and associated PDCCH/PCFICH). Whenever there is a PDSCH transmission or a PDCCH transmission without PDSCH in SF0 outside the DTxW, after eNB successfully clears Cat4 LBT for such a subframe, the transmitted SF may include PSS/SSS/CRS, CSI-RS, if configured, MF-PSS/MF-SSS, MIB-MF on MF-PBCH, and optionally SIB-MF on PDSCH (and associated PDCCH/PCFICH). In this example, it can be seen that the enhanced synchronization signals (together with MIB) are also transmitted outside the DMTC window on SF0 if there is a PDCCH/PDSCH transmission.

Figure 9:
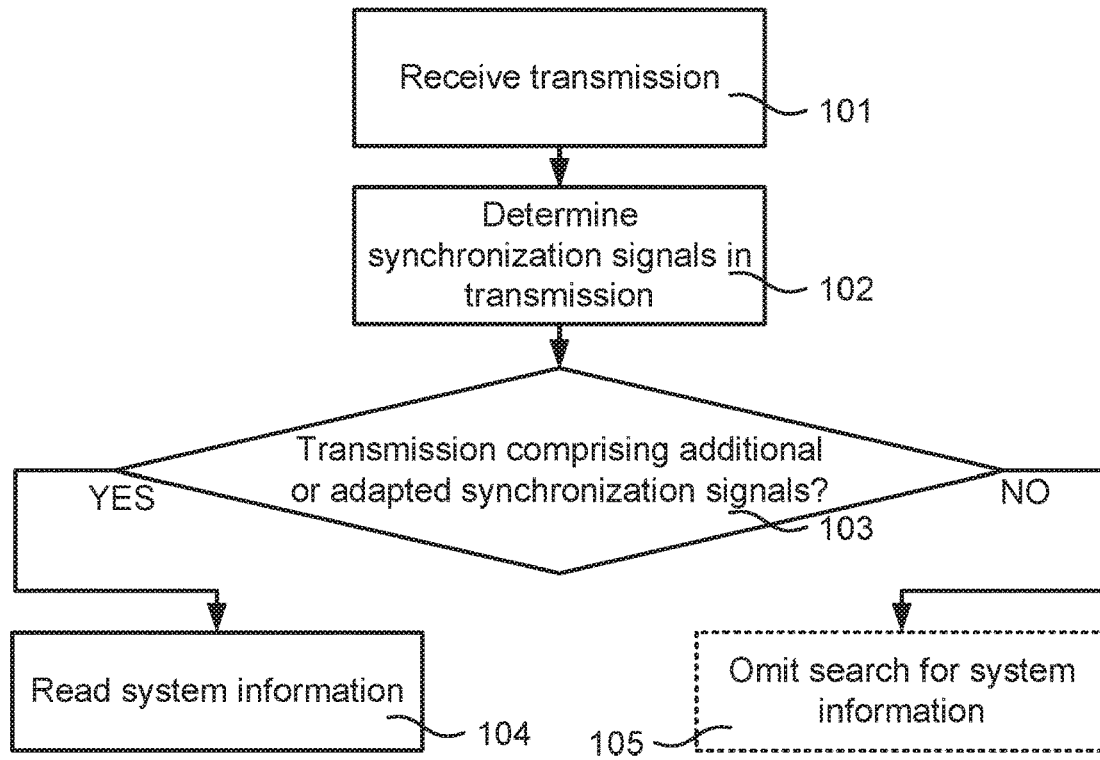
FIG. 9 is a flow chart illustrating a method according to an embodiment.

FIG. 9 is a flow chart illustrating a method of a wireless device operating in a cellular network for a licensed or unlicensed frequency band and arranged for being served by a network node in an unlicensed frequency band. Here, it is assumed that the wireless device is not assisted from a network node, operating in a licensed frequency band, whereby the wireless device is left to its oven devices to figure out the kind of transmission and to try to obtain system information from transmissions on the unlicensed frequency band. According to the discussions above, problems raised by this are alleviated by the approach that the wireless device is enabled to discriminate transmissions holding such information. Thus, the wireless device receives 101 a transmission and determines 102 synchronization signals in the transmission. The wireless device then determines 103 whether the transmission comprises airy additional or adapted synchronization signals, i.e., whether the synchronization signals of the transmission deviates from other transmissions which may only comprise for example ordinary primary and secondary synchronization signals arranged at known positions in the transmission and/or having a known sequence. If no such additional or adapted synchronization signals are present, the wireless device will know that there is no system information present in the transmission, and can omit 105 searching for any in the transmission, and thereby save power and/or processing effort. On the other hand, if there is an additional or adapted synchronization signal, the wireless device knows that the system information is present and can invest the effort and read 104 the system information. The recognition of the adapted and/or added synchronization signals will be evident from the embodiments and variants demonstrated with reference to FIGS. 15-19.

In this context, the synchronization signal sequences may be generated according to predetermined rules. For example, the primary synchronization signal may be generated as a constant amplitude zero autocorrelation, CAZAC, sequence, e.g., a Zadoff-Chu sequence where different root values may be selected, and the secondary synchronization signal may be generated as a combination of binary sequences where the combination then may be scrambled with a selected scrambling sequence. There may be a coupling between the generation of the primary and the secondary synchronization signal, e.g., by the selection of the root value for the primary synchronization signal and the selection of the scrambling sequence for the secondary synchronization signal.

Figure 10:
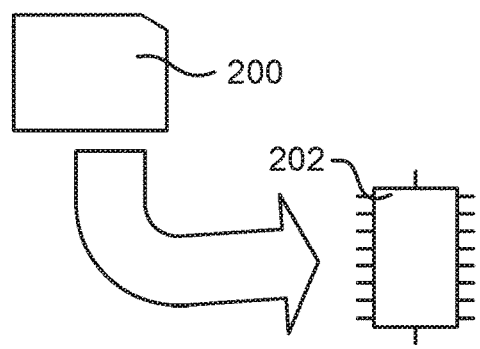
FIG. 10 schematically illustrates a computer-readable medium and a processing device.

The methods according to the present invention is suitable for implementation with aid of processing means, such as computers and/or processors, especially for the case where the processing element 420 demonstrated below comprises a processor handling operation in unlicensed frequency band without assistance from a network node operating in a licensed frequency band. Therefore, there is provided computer programs, comprising instructions arranged to cause the processing means, processor, or computer to perform the steps of any of the methods according to any of the embodiments described with reference to FIG. 8 or 9, respectively in a network node or a wireless device. The computer programs preferably comprise program code that is stored on a computer readable medium 200, as illustrated in FIG. 10, which can be loaded and executed by a processing means, processor, or computer 202 to cause it to perform the methods, respectively, according to embodiments of the present invention, preferably as any of the embodiments described with reference to FIGS. 15 to 19. The computer 202 and computer program product 200 can be arranged to execute the program code sequentially where actions of the any of the methods are performed stepwise, but may as well operate according to a real-time principle. The processing means, processor, or computer 202 is preferably what normally is referred to as an embedded system, which may be embedded into a network node or a wireless device as demonstrated herein. Thus, the depicted computer readable medium 200 and computer 202 in FIG. 10 should be construed to be for illustrative purposes only to provide understanding of the principle, and not to be construed as any direct illustration of the elements.

Figure 11:
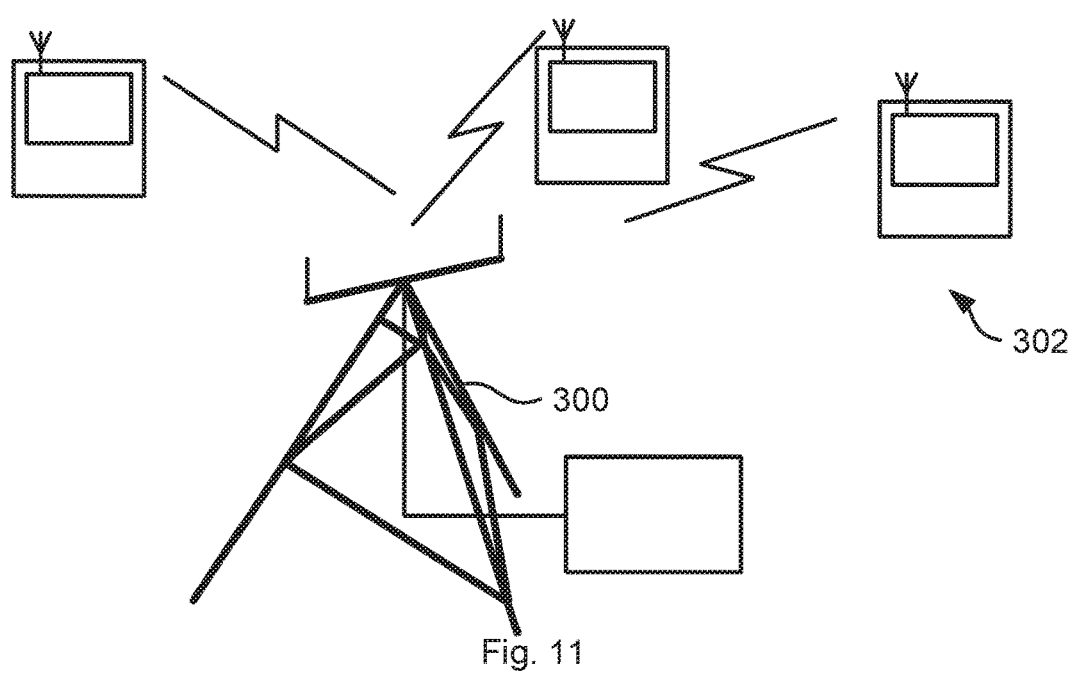
FIG. 11 illustrates a network node according to an embodiment.

FIG. 11 illustrates a cellular network comprising a network node 300, e.g., an eNodeB, for wireless access operating in the cellular network for a licensed or unlicensed frequency band and arranged for serving wireless devices 302 in an unlicensed frequency band. The network node is arranged to operate according to any of the approaches or combination of approaches as demonstrated above.

Figure 12:
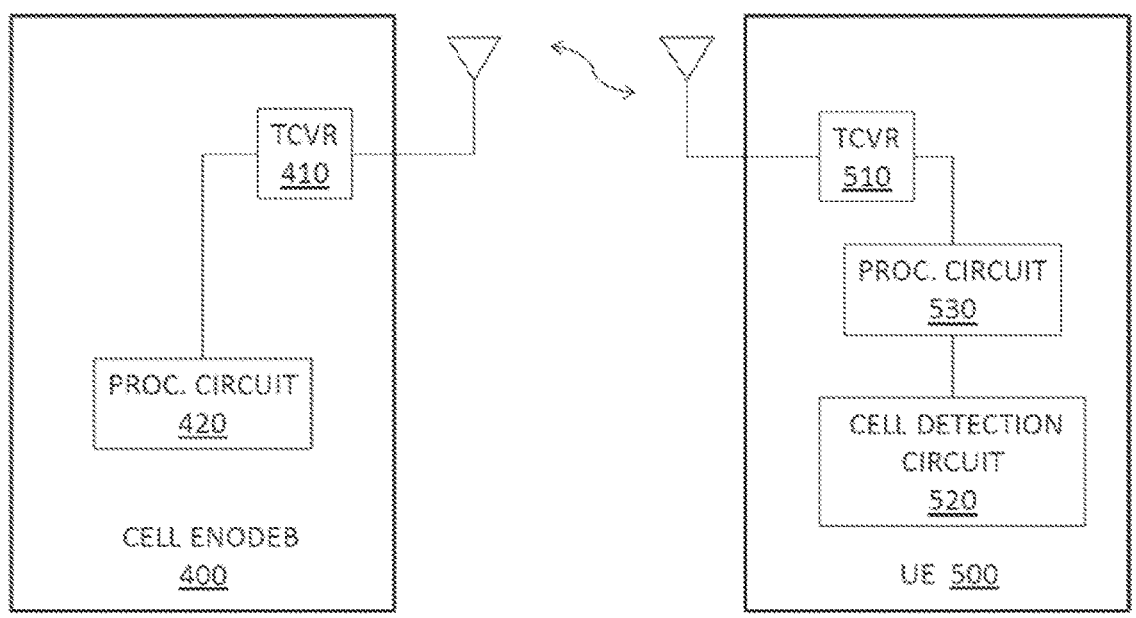
FIG. 12 is a block diagram schematically illustrating a network node and a UE according to an embodiment.
Figure 13:
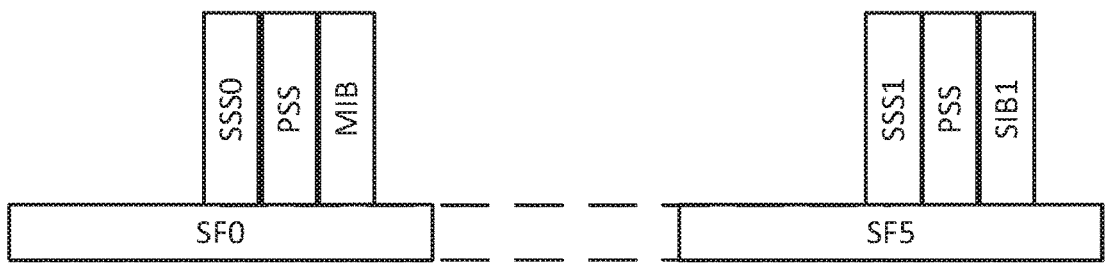
FIG. 13 illustrates a relationship with the position of synchronization signals and the position of the master information block (MIB) and system information block type 1, SIB1 in LTE Release 12.
Figure 14:
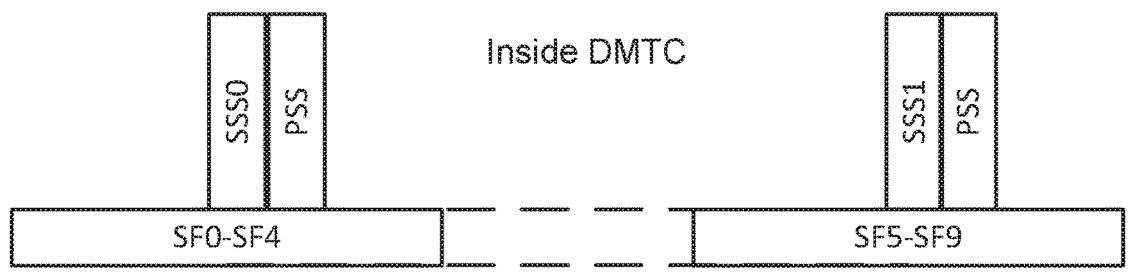
FIG. 14 illustrates a relationship corresponding to that of FIG. 13, but for LTE Release 13.
Figure 14:
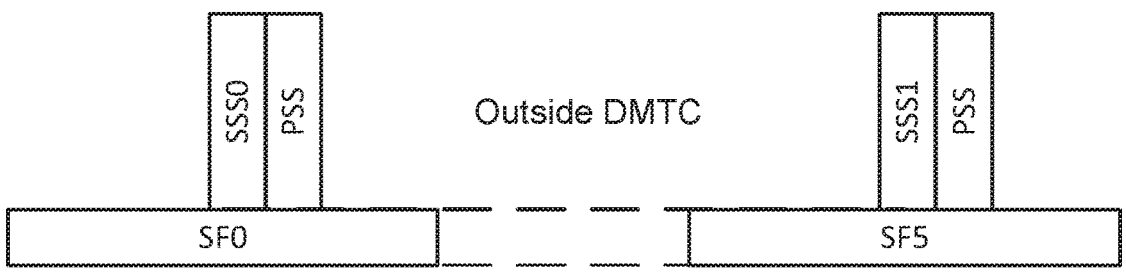

FIG. 12 shows block diagrams of one exemplary network node 400, e.g., eNodeB, serving a cell and of a UE 500, and how they interact in an exemplary wireless communication network. The eNodeB serving the cell in the u licensed frequency band 400 includes a transceiver 410 and a processing circuit 420. The transceiver 410 and/or processing circuit 420 may perform the steps detailed in FIG. 8 or 9. The UE 500 includes a transceiver 510, SCell detection circuit 520, and processing circuit 530. Transceiver 510 receives signals associated with the preamble and the transmission.

Figure 15:
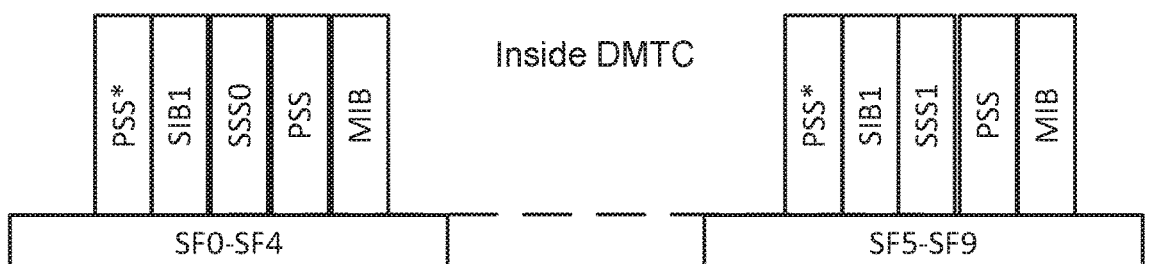
FIGS. 15-19 illustrate relationships according to embodiments.
Figure 15:
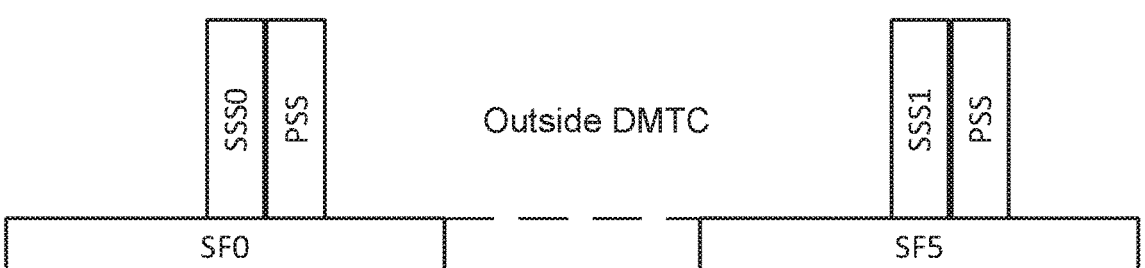

FIG. 15 illustrates relationships for transmissions within the DMTC window, i.e., DRS transmission, and outside the DMTC window according to an embodiment. Outside the DMTC window, primary and secondary synchronization signals, PSS and SSS, are transmitted in subframes 0 and 5, SF0 and SF5. In SF0, the SSS is transmitted using sequence code 0 as SSS0, while in SF5 the SSS is transmitted using sequence code 1 as SSS1. Inside the DMTC window, i.e., a DRS transmission including system information MIB and SIB1, there is further additionally a further PSS included at a position, which preferably is predetermined. The PSS may be a replica of the ordinary PSS as illustrated by the variant in FIG. 17, i.e., the one at its original position, or may be slightly adapted as indicated in FIG. 15, i.e., as PSS* e.g., changed sequence code, which may be a Zadoff-Chu code or other CAZAC sequence with desired properties. The change may for example be that the root sequence number is changed from the ordinary one forming the PSS*. Here, it may be advantageous to use a root sequence number that is not used in any other legacy synchronization forming within the communication system. The latter has the advantage that the primary synchronization mechanism may easier distinguish the ordinary PSS and its position from the added one. The former may have the advantage of less complexity. However, for easier detection compared with the former, the SSS may be replicated instead, as will be demonstrated with reference to FIG. 16.

Figure 16:
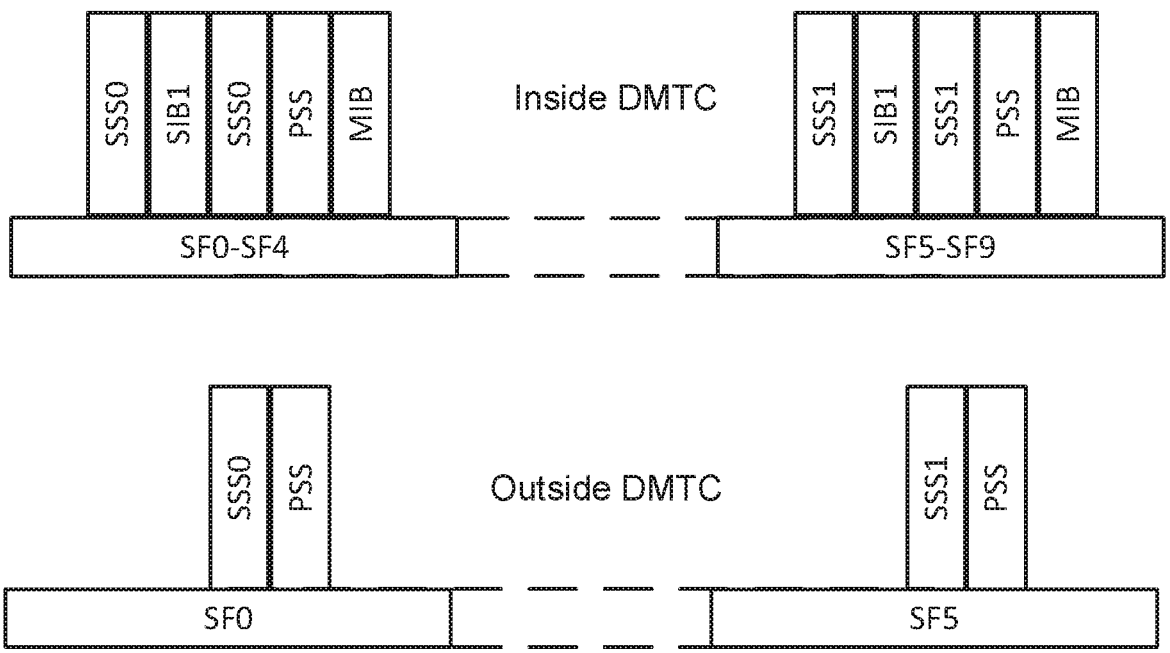
Figure 17:
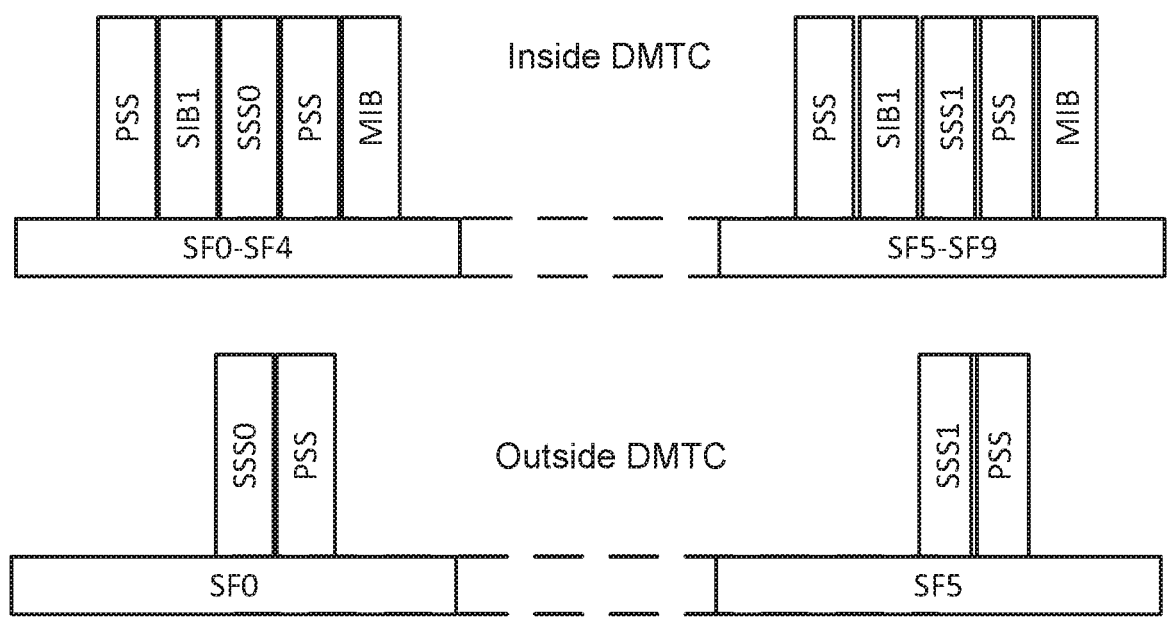

FIG. 16 illustrates relationships for transmissions within the DMTC window, i.e., DRS transmission, and outside the DMTC window according to an embodiment. Outside the DMTC window, primary and secondary synchronization signals, PSS and SSS, are transmitted in subframes 0 and 5, SF0 and SF5. In SF0, the SSS is transmitted using sequence code 0 as SSS0, while in SF5 the SSS is transmitted using sequence code 1 as SSS1. Inside the DMTC window, i.e., a DRS transmission including system information MIB and SIB1, there is further additionally a further SSS included at a position, which preferably is predetermined. The SSS may be a replica of the ordinary SSS, i.e., with a sequence code according to its presence in which subframe.

Figure 18:
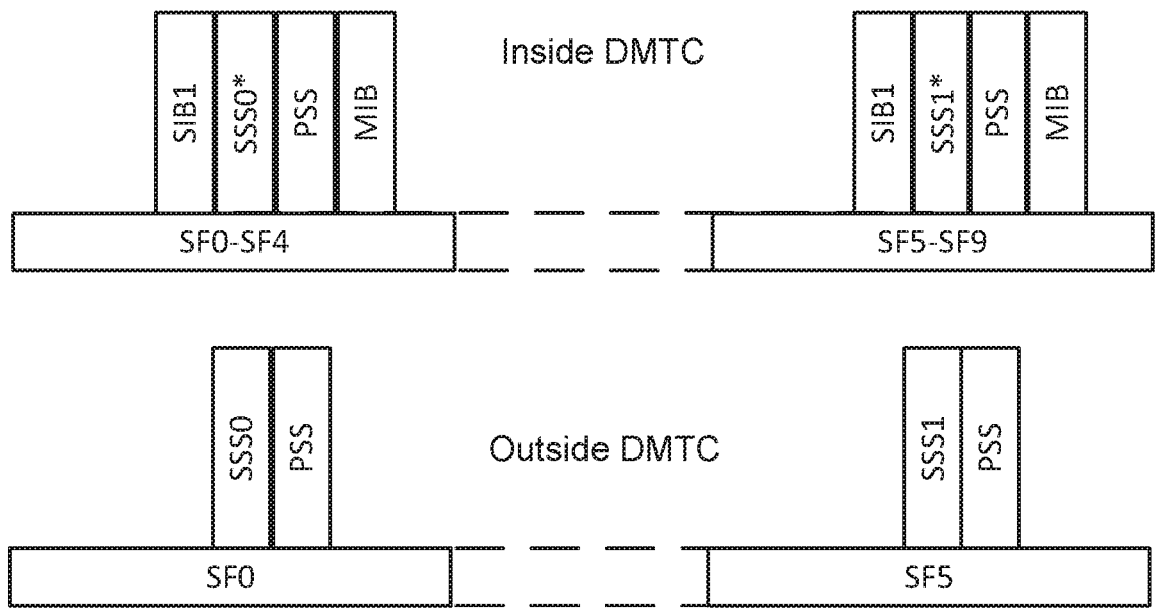

FIG. 18 illustrates relationships for transmissions within the DMTC window, i.e., DRS transmission, and outside the DMTC window according to an embodiment. Outside the DMTC window, primary and secondary synchronization signals, PSS and SSS, are transmitted in subframes 0 and 5, SF0 and SF5. In SF0, the SSS is transmitted using sequence code 0 as SSS0, while in SF5 the SSS is transmitted using sequence code 1 as SSS1. Inside the DMTC window, i.e., a DRS transmission including system information MIB and SIB1, the SSS is adapted, as indicated by SSS0*, e.g., by changed sequence.

From the demonstrated embodiments of adaptations and additions of synchronization signals and/or the predetermined mutual positioning of system information in relation to added synchronization signals and/or adapted synchronization signals, the wireless terminal can readily identify the presence of the system information and acquire further cell information. The wireless device will for example be enabled to identify the adapted synchronization signal by identifying that one of the first and second synchronization signals has a different sequence than for a legacy DRS or for a transmission other than the transmission of the DRS in a DMTC window in some embodiments. Any of the herein demonstrated embodiments will thus facilitate for the wireless device to find desired system information. This may reduce demands on processing power, necessary time to search information, and/or consumed power to acquire the desired system information.

Figure 19:
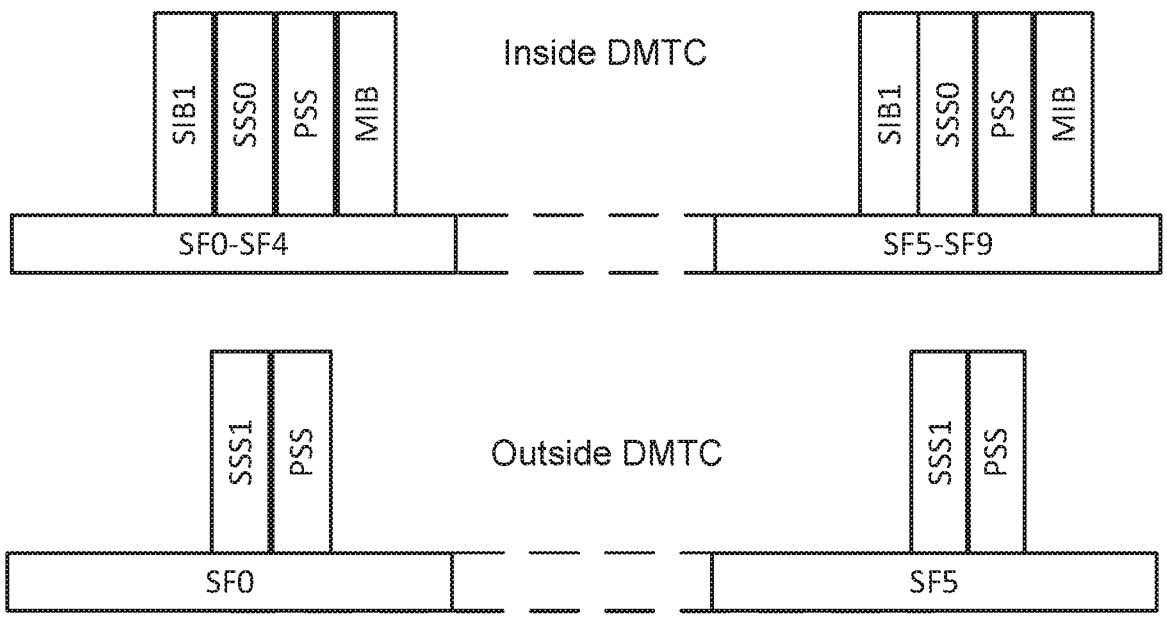

FIG. 19 illustrates relationships for transmissions within the DMTC window, i.e., DRS transmission, and outside the DMTC window according to an embodiment. Outside the DMTC window, primary and secondary synchronization signals, PSS and SSS, are transmitted in subframes 0 and 5, SF0 and SF5. In both SF0 and SF5, the SSS is transmitted using sequence code 1 as SSS1. Inside the DMTC window, i.e., a DRS transmission including system information MIB and SIB1, the SSS is adapted, i.e., by using sequence code 0, i.e., as SSS0. Thus, here the SSS0 and SSS1 are used to distinguish between whether being inside or outside the DMTC window instead of distinguishing whether in which subframe.

From the different embodiments, variants and examples demonstrated above it is evident that combinations, variants and adaptations thereof for acquiring the ability to distinguish between whether in the DMTC window, i.e., making DRS transmission, or outside the DMTC window making other transmissions are readily available for the skilled person having read this disclosure. For example, one or more synchronization signals may be added and/or one or more synchronization signals may be adapted.

The solutions presented herein provide many advantages over existing solutions. For example, the solution presented herein enables an LTE network operating in an unlicensed frequency hand, without assistance from a network node operating in a licensed frequency hand, to improve network performance by improving the ability for the UE to operate efficiently. It will be appreciated that the solutions presented herein are applicable to both the LTE-U Forum and 3GPP implementations, as well as to other LTE-like transmissions in unlicensed spectrum.

What is claimed is:

1. A method, in a network node for wireless access operating a cell in a cellular network for a licensed or unlicensed frequency band and arranged for serving wireless devices in an unlicensed frequency band, wherein the method comprises:
   transmitting a discovery reference signal (DRS) comprising a first and a second synchronization signal for enabling the wireless devices to find and measure the cell, and wherein the DRS, when the network node operates a primary cell in the unlicensed frequency band, comprises system information; and
   including a third synchronization signal in the DRS, in addition to the first and second synchronization signals, wherein the presence of the third synchronization signal in the DRS indicates, to wireless devices, the presence of the system information in the DRS.

2. The method of claim 1, wherein the system information is contained in a master information block (MIB) and in a system information block (SIB).

3. The method of claim 2, wherein the MIB and the SIB and the first and the second synchronization signals are mutually positioned in the DRS at predetermined positions.

4. The method of claim 1, wherein the method further comprises omitting inclusion of the system information in transmissions other than transmissions of the DRS in discovery measurement timing configuration (DMTC) windows when the network node operates a primary cell in the unlicensed frequency band.

5. The method of claim 1, wherein the first synchronization signal is a primary synchronization signal (PSS) and the second synchronization signal is a secondary synchronization signal (SSS).

6. The method of claim 1, wherein the third synchronization signal comprises a synchronization signal being a replica corresponding to the first or the second synchronization signal.

7. The method of claim 1, wherein the third synchronization signal corresponds to the first or the second synchronization signal but with a different sequence.

8. The method of claim 1, wherein the method further comprises, at DRS transmissions outside a discovery measurement timing configuration (DMTC) window, including system information, and a first and a second synchronization signal, for enabling the wireless devices to find and measure the cell.

9. The method of claim 1, wherein the first synchronization signal is a primary synchronization signal (PSS) and the second synchronization signal is a secondary synchronization signal (SSS).

10. A network node for wireless access operating a cell in a cellular network for a licensed or unlicensed frequency band and arranged for serving wireless devices in an unlicensed frequency band, wherein the network node comprises:
    a transceiver; and
    a processing circuit operatively coupled to the transceiver;
    wherein the transceiver and processing circuit are configured to:
       transmit a discovery reference signal (DRS) comprising a first and a second synchronization signal for enabling the wireless devices to find and measure the cell, and wherein the DRS, when the network node operates a primary cell in the unlicensed frequency band, comprises system information, and
       include a third synchronization signal in the DRS, in addition to the first and second synchronization signals, wherein the presence of the third synchronization signal in the DRS indicates, to wireless devices, the presence of the system information in the DRS.

11. The network node of claim 10, wherein the transceiver and processing circuit are configured to omit inclusion of the system information in transmissions other than transmissions of the DRS in a-discovery measurement timing configuration (DMTC) windows when the network node operates a primary cell in the unlicensed frequency band.

12. The network node of claim 10, wherein the third synchronization signal corresponds to the first or the second synchronization signal but with a different sequence code.

13. A method, in a wireless device operating in a cellular network for a licensed or unlicensed frequency band and arranged for being served by a network node in an unlicensed frequency band, wherein the method comprises:
    receiving a transmission from the network node;
    determining synchronization signals in the transmission;
    determining, from the synchronization signals, whether it is a discovery reference signal (DRS) comprising system information by identifying an additional or adapted synchronization signal in the transmission, relative to synchronization signals included in a received DRS that does not include system information; and
    reading the system information upon determined presence of the system information.

14. The method of claim 13, wherein the system information is contained in a master information block (MIB) and in a system information block (SIB).

15. The method of claim 14, wherein the method further comprises finding the MIB and the SIB and the first and the second synchronization signals contained in the DRS at predetermined positions related to each other.

16. The method of claim 13, wherein the method comprises omitting search for the system information in the transmissions when no additional or adapted synchronization signal is found.

17. The method of claim 13, wherein the first synchronization signal is a primary synchronization signal (PSS) and the second synchronization signal is a secondary synchronization signal (SSS).

18. The method of claim 13, wherein the additional synchronization signal comprises a synchronization signal being a replica corresponding to the first or the second synchronization signal.

19. The method of claim 13, wherein the method comprises identifying the additional synchronization signal as a synchronization signal corresponding to the first or the second synchronization signal but with a different sequence.

20. The method of claim 13, wherein the method comprises identifying the adapted synchronization signal by identifying that one of the first and second synchronization signals has a different sequence than for a legacy DRS or for a transmission other than the transmission of the DRS in a discovery measurement timing configuration (DMTC) window when the network node operates a primary cell in the unlicensed frequency band.

21. The method of claim 13, wherein the method comprises identifying the adapted synchronization signal by identifying that one of the first and second synchronization signals has a different sequence for the DRS in a discovery measurement timing configuration (DMTC) window than for a transmission other than the transmission of the DRS in the DMTC window when the network node operates a primary cell in the unlicensed frequency band.

22. A wireless device operating in a cellular network for a licensed or unlicensed frequency band and arranged for being served by a network node in an unlicensed frequency band, wherein the wireless device comprises:
  a transceiver; and
  a processing circuit operatively coupled to the transceiver;
wherein the transceiver and processing circuit are configured to:
  receive a transmission from the network node,
  determine synchronization signals in the transmission, and,
  from the synchronization signals determine whether it is a discovery reference signal (DRS) comprising system information by identifying an additional or adapted synchronization signal in the transmission, relative to synchronization signals included in a received DRS that does not include system information, and, upon determined presence of the system information, read the system information.

23. The wireless device of claim 22, wherein the system information is contained in a master information block (MIB) and in a system information block (SIB), and wherein the transceiver and processing circuit are configured to find the MIB and the SIB, and the first and the second synchronization signals contained in the DRS at predetermined mutual positions.

24. The wireless device of claim 22, wherein the transceiver and processing circuit are configured to omit searching for the system information in the transmissions when no additional or adapted synchronization signal is found.

25. The wireless device of claim 22, wherein the transceiver and processing circuit are configured to identify the additional synchronization signal as a synchronization signal corresponding to the first or the second synchronization signal but with a different sequence.

26. The wireless device of claim 22, wherein the transceiver and processing circuit are configured to identify the adapted synchronization signal by identifying that one of the first and second synchronization signals has a different sequence than for a legacy DRS or for a transmission other than the transmission of the DRS in a discovery measurement timing configuration (DMTC) window when the network node operates a primary cell in the unlicensed frequency band.

27. The wireless device of claim 22, wherein the transceiver and processing circuit are configured to identify the adapted synchronization signal by identifying that one of the first and second synchronization signals has a different sequence for the DRS transmission in a discovery measurement timing configuration (DMTC) window than for a transmission other than the transmission of the DRS in the DMTC window when the network node operates a primary cell in the unlicensed frequency band.

28. A method, in a network node for wireless access operating a cell in a cellular network for a licensed or unlicensed frequency band and arranged for serving wireless devices in an unlicensed frequency band, wherein the method comprises:
  transmitting a discovery reference signal (DRS) comprising a first and a second synchronization signal for enabling the wireless devices to find and measure the cell, and wherein the DRS, when the network node operates a primary cell in the unlicensed frequency band, comprises system information, the system information being contained in a master information block (MIB) and in a system information block (SIB); and
  adapting the first or second synchronization signal, relative to transmissions of the first and second synchronization signals in DRSs transmitted by the network node but that do not include system information, wherein the adapting of the first or second synchronization signal in the DRS indicates, to wireless devices, the presence of the system information in the DRS.

29. The method of claim 28, wherein the adapting of the first or second synchronization signal comprises adapting one of the first and second synchronization signals to have a different sequence than for a legacy DRS or for a transmission other than the transmission of the DRS in a discovery measurement timing configuration (DMTC) window when the network node operates a primary cell in the unlicensed frequency band.

30. The method of claim 28, wherein the adapting of the first or second synchronization signal comprises adapting one of the first and second synchronization signals to have a different sequence for the DRS transmission in a discovery measurement timing configuration (DMTC) window than for a transmission other than the transmission of the DRS in the DMTC window when the network node operates a primary cell in the unlicensed frequency band.

31. The method of claim 28, wherein the MIB and the SIB and the first and the second synchronization signals are mutually positioned in the DRS at predetermined positions.

32. The method of claim 28, wherein the method further comprises omitting inclusion of the system information in transmissions other than transmissions of the DRS in discovery measurement timing configuration (DMTC) windows when the network node operates a primary cell in the unlicensed frequency band.

33. A network node for wireless access operating a cell in a cellular network for a licensed or unlicensed frequency band and arranged for serving wireless devices in an unlicensed frequency band, wherein the network node comprises:
a transceiver; and
a processing circuit operatively coupled to the transceiver;
wherein the transceiver and processing circuit are configured to:
transmit a discovery reference signal (DRS) comprising a first and a second synchronization signal for enabling the wireless devices to find and measure the cell, and wherein the DRS, when the network node operates a primary cell in the unlicensed frequency band, comprises system information, the system information being contained in a master information block (MIB) and in a system information block (SIB), and
adapt the first or second synchronization signal, relative to transmissions of the first and second synchronization signals in DRSs transmitted by the network node but that do not include system information, such that the adapting of the first or second synchronization signal in the DRS indicates, to wireless devices, the presence of the system information in the DRS.

34. The network node of claim 33, wherein the adapted synchronization signal comprises that one of the first and second synchronization signals has a different sequence than for a legacy DRS or for a transmission other than the transmission of the DRS in a discovery measurement timing configuration (DMTC) window when the network node operates a primary cell in the unlicensed frequency band.

35. The network node of claim 33, wherein the adapted synchronization signal comprises that one of the first and second synchronization signals has a different sequence for the DRS transmission in a discovery measurement timing configuration (DMTC) window than for a transmission other than the transmission of the DRS in the DTMC window when the network node operates a primary cell in the unlicensed frequency band.

\* \* \* \* \*